US 9,145,100 B2

(12) United States Patent
Watanabe (10) Patent No.: US 9,145,100 B2
(45) Date of Patent: Sep. 29, 2015

(54) IN-VEHICLE ECU

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventor: Akiyo Watanabe, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/350,385

(22) PCT Filed: Oct. 5, 2012

(86) PCT No.: PCT/JP2012/075968
§ 371 (c)(1),
(2) Date: Apr. 8, 2014

(87) PCT Pub. No.: WO2013/054761
PCT Pub. Date: Apr. 18, 2013

(65) Prior Publication Data
US 2014/0214233 A1    Jul. 31, 2014

(30) Foreign Application Priority Data

Oct. 12, 2011  (JP) ................................. 2011-224953

(51) Int. Cl.
*G06F 7/00*     (2006.01)
*B60R 16/03*    (2006.01)
*G06F 1/32*     (2006.01)
*H02J 9/00*     (2006.01)

(52) U.S. Cl.
CPC .............. *B60R 16/03* (2013.01); *G06F 1/3203* (2013.01); *G06F 1/3206* (2013.01); *G06F 1/3228* (2013.01); *G06F 1/3287* (2013.01); *H02J 9/005* (2013.01); *Y02B 60/1282* (2013.01)

(58) Field of Classification Search
USPC .................................... 701/1, 36, 48; 713/320
See application file for complete search history.

(56) References Cited

U.S. PATENT DOCUMENTS 6,184,783 B1    2/2001  Sumida
2009/0070608 A1  3/2009  Kobayashi
2010/0312417 A1*  12/2010  Wakabayashi et al. ........... 701/1

FOREIGN PATENT DOCUMENTS

JP    A 11-115650    4/1999
JP    A 2005-78221    3/2005

(Continued)

OTHER PUBLICATIONS

Nov. 13, 2012 Search Report issued in International Patent Application No. PCT/JP2012/075968.

*Primary Examiner* — Tuan C. To
*Assistant Examiner* — Isaac Smith
(74) *Attorney, Agent, or Firm* — Oliff PLC (57) ABSTRACT

An in-vehicle ECU is provided that minimizes electric power consumption while an internal microcomputer does not need to operate. Furthermore, a power supply IC stops supplying an operation power from a power supply output unit in a pre-OFF mode, and restarts the supply of the operation power to the microcomputer when an OR gate output signal is "H". A CPU of the microcomputer, if, at the time of the restart of the operation power after the pre-OFF mode was set, a predetermined time has elapsed since the pre-OFF mode was set, without any change in an activation factor, which is to serve as a factor for activating the microcomputer, based on whether or not there is a temporal change in external input information, outputs a power supply control signal of "H" in order to execute a power supply stop operation for stopping supplying electric power to ECUs subjected to power supply control.

8 Claims, 6 Drawing Sheets

(56) References Cited

FOREIGN PATENT DOCUMENTS

| JP | A 2008-107999 | 5/2008 |
| JP | B2 4149789 | 7/2008 |
| JP | A 2009-70093 | 4/2009 |
| JP | A 2010-280314 | 12/2010 |

* cited by examiner

| DETERMINATION DATA CD | RESET | PRE-OFF | COMPLETELY-OFF |
|---|---|---|---|
| VALUE TO BE STORED IN NON-VOLATILE RAM 15 | 0X0001 | 0x0010 | 0x0100 |

IN-VEHICLE ECU

CROSS-REFERENCE TO RELATED APPLICATIONS

This application is a national stage application of PCT/US2012/075968, filed on Oct. 5, 2012, which claims priority to JP 2011-224953 filed in Japan on Oct. 12, 2011, the entire disclosures of both applications are hereby incorporated by reference in their entireties.

TECHNICAL FIELD

Embodiments of the present invention relate to an in-vehicle ECU (Electronic Control Unit) that is installed in a vehicle.

BACKGROUND

Conventionally, a plurality of electronic devices, called in-vehicle ECUs, are installed in a vehicle, and operate in a coordinated manner while exchanging information with each other via a network such as a CAN (Controller Area Network), thereby realizing control relating to, for example, running of the vehicle and comfort in the vehicle interior and the like. Furthermore, the in-vehicle ECUs are connected to an electric power supply, such as a battery or an alternator, of the vehicle via electric power lines, and operate with electric power supplied from the electric power supply. In recent years, the number of in-vehicle ECUs installed in a vehicle has increased, leading to a demand for power saving.

Furthermore, with high functionality of a vehicle, a plurality of sophisticated microcomputers (hereinafter, referred to simply as "microcomputers") are installed for in-vehicle ECUs. In order to drive these microcomputers, the electric power consumption and dark currents increase, which may cause a battery to run out and fuel efficiency to deteriorate. Accordingly, it is a common practice that a microcomputer has a HALT mode (mode in which instruction execution of a CPU is interrupted) and a STOP mode (mode in which operations of the CPU and peripheral circuits are stopped), and operates intermittently in a normal mode, with the above-described HALT mode (STOP mode) inserted therein.

A drive control apparatus for an in-vehicle device that is disclosed in Patent Document 1 is taken as an example of an in-vehicle ECU that can reduce electric power consumption. This control apparatus includes an approach sensor for detecting an object that approaches a vehicle, and a controller intermittently switches the approach sensor on to drive it intermittently. If the approach sensor, when intermittently driven by the controller, detects an object approaching the vehicle, the controller starts driving an intrusion sensor that is subjected to drive control and remains undriven until then.

RELATED ART

Patent Document 1: JP 4149879

SUMMARY

Technical Problem

In the HALT mode and the STOP mode of a microcomputer, the main operation of the microcomputer is stopped but electric power is always supplied to the microcomputer itself, causing the problem that an electric power that is not zero is consumed also during the HALT mode and the STOP mode.

The same is true for the control apparatus disclosed in Patent Document 1. That is, electric power is always supplied to the controller (that corresponds to a microcomputer) for driving the approach sensor and the intrusion sensor, and to a security ECU for controlling the controller, causing the problem that the reduction in electric power consumption is impossible in this regard.

Embodiments of the present disclosure were made in order to solve the above-described problem, and it is an object of the embodiments of the present disclosure to achieve an in-vehicle ECU that reduces electric power consumption to the minimum while an internal microcomputer does not need to operate.

Solution to Problem

In some embodiments, an in-vehicle ECU includes a function to stop supplying electric power to at least one ECU subjected to power supply control, the in-vehicle ECU including: a microcomputer that operates with supply of an operation power, and is set to a pre-OFF mode if a predetermined condition is satisfied during the operation; and a power supply unit that supplies the operation power to the microcomputer when a normal mode is set, and stops the supply of the operation power to the microcomputer when the pre-OFF mode is set, wherein the power supply unit includes a counter circuit that is capable of counting a lapse of a predetermined time when the pre-OFF mode is set, and the power supply unit restarts the supply of the operation power to the microcomputer when the counter circuit counts the lapse of the predetermined time, and the microcomputer executes a power supply stop operation for stopping supplying electric power to the at least one ECU subjected to power supply control if recognizing, at the time of the restart of the supply of the operation power after the pre-OFF mode was set, that the predetermined time has elapsed since the pre-OFF mode was set, without any change in an activation factor, which is to serve as a factor for activating the microcomputer.

An in-vehicle ECU, in embodiments, further includes an external change detection unit that detects, when the pre-OFF mode is set, a change in an activation factor, which is to serve as a factor for activating the microcomputer, of external input information indicating a vehicle-related external input content, and outputs a detection signal, wherein the power supply unit restarts the supply of the operation power to the microcomputer if the detection signal indicates the change in the activation factor of the external input information, when the pre-OFF mode is set, the microcomputer includes a non-volatile memory, and the microcomputer receives the external input information and writes the external input information into the non-volatile memory, when the pre-OFF mode is set, and the microcomputer compares newly received external input information with the external input information read out from the non-volatile memory, at the time of the restart of the supply of the operation power after the pre-OFF mode was set, and executes the power supply stop operation if there is no change in the content.

In embodiments, the power supply unit includes: a power supply IC that is formed into one chip; and a counter circuit that is formed separately from the power supply IC.

The power supply unit, in embodiments, includes a power supply IC that includes the counter circuit and is formed into one chip.

Effects of Some Embodiments

In some embodiments, the power supply unit stops supplying an operation power to the microcomputer when the pre- OFF mode is set, and restarts the supply of the operation power to the microcomputer when the counter circuit counts a lapse of a predetermined time.

Accordingly, this brings about an effect that, when the pre-OFF mode is set, the microcomputer can appropriately return to the operation state when needed while reducing the electric power consumption of the microcomputer to zero by stopping the supply of the operation power to the microcomputer.

Furthermore, in embodiments, if the microcomputer recognizes, at the time of the restart of the supply of the operation power after the pre-OFF mode was set, that the predetermined time has elapsed since the pre-OFF mode was set, without any change in an activation factor, which is to serve as a factor for activating the microcomputer to execute the power supply stop operation for stopping supplying electric power to at least one ECU subjected to power supply control, thereby making it possible to realize a reduction in the electric power consumption of at least one ECU subjected to power supply control.

In embodiments, the microcomputer compares newly received external input information with the external input information read out from the non-volatile memory at the time of the restart of the supply of the operation power after the pre-OFF mode was set, and executes the power supply stop operation if there is no change in the content.

Accordingly, even if the microcomputer is turned off until the restart of the supply of the operation power after the pre-OFF mode was set, it is possible to correctly recognize whether or not a predetermined time has elapsed since the pre-OFF mode was set, without any change in an activation factor, which is to serve as a factor for activating the microcomputer.

In the present invention according to claim 3, by realizing a separate configuration of the power supply IC and the counter circuit, it is possible to configure the power supply unit with a power supply IC that does not include a counter circuit.

In the present invention according to claim 4, by realizing the power supply IC that includes the counter circuit and is formed into one chip, it is possible to simplify the apparatus configuration.

The objects, features, aspects, and advantages of the present invention will become more apparent from the following detailed description of the invention and the accompanying drawings.

DETAILED DESCRIPTION

Embodiment 1

Figure 1:
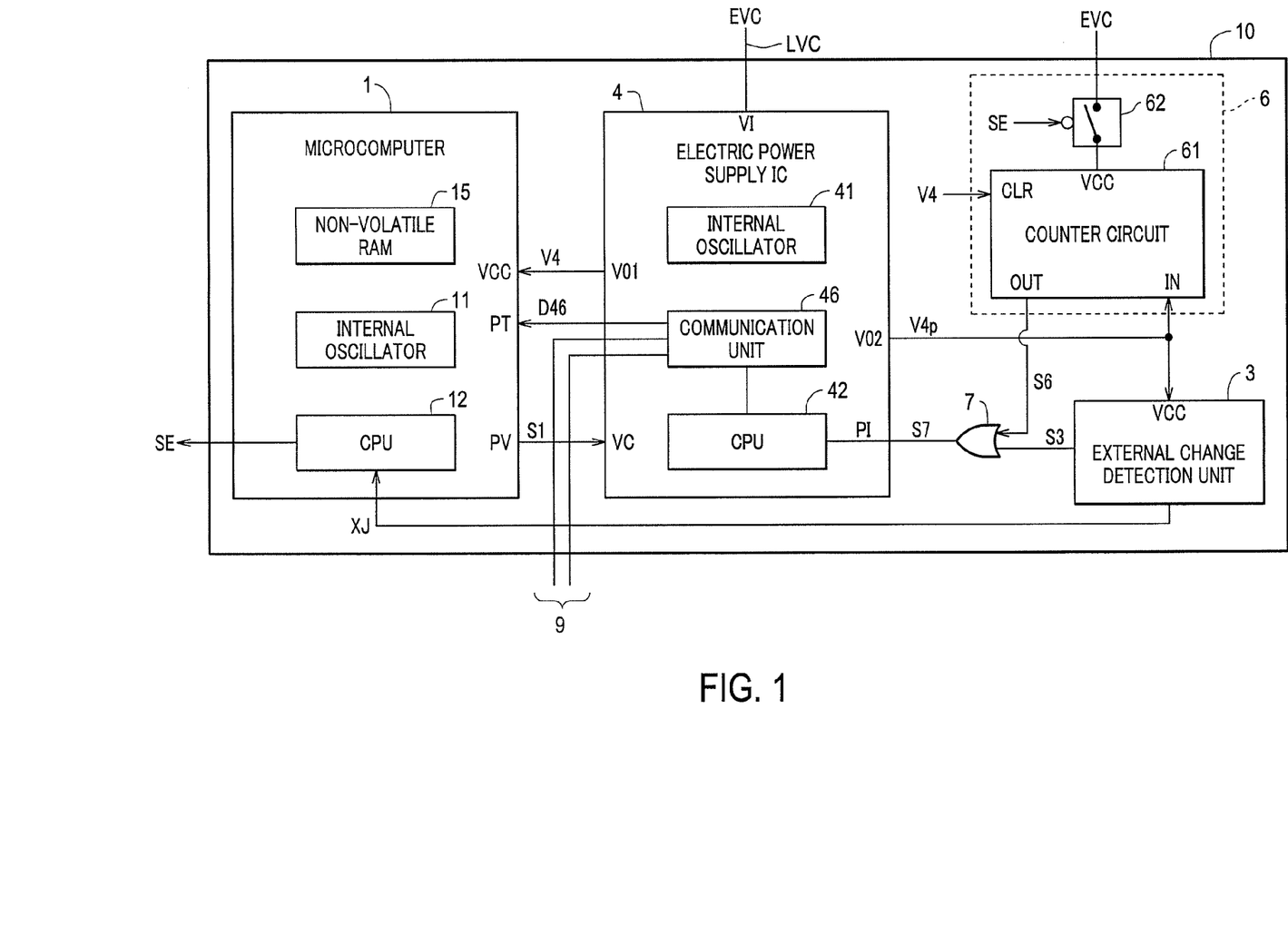
FIG. 1 is a block diagram illustrating an internal configuration of an in-vehicle ECU according to an embodiment of the present invention.

FIG. 1 is a block diagram illustrating an internal configuration of an in-vehicle ECU according to Embodiment 1 of the present invention. An in-vehicle ECU 10 of Embodiment 1 includes a microcomputer 1, an external change detection unit 3, a power supply IC 4, a counter unit 6, and an OR gate 7.

The microcomputer 1 includes an internal oscillator 11, a CPU 12, and a non-volatile RAM 15. The microcomputer 1 operates when an operation power V4 is supplied to a power supply input VCC, and the CPU 12 operates with a clock generated by the internal oscillator 11 during the operation state of the microcomputer 1, and receives external input information XJ, which shows the states of (a group of) switches of the external change detection unit 3.

Then, the CPU 12, if having detected an external input (occurrence thereof) from any of the group of switches based on the external input information XJ, performs predetermined operation control that depends on the content of the detected external input. Note that it is sufficient that the group of switches imports environmental changes in the vehicle as external inputs, and the switches may include not only common swathes such as a switch input for a power window but also sensors and the like.

The CPU 12 performs writing of determination data CD and the external input information XJ into the non-volatile RAM 15 at the time of shifting to a pre-OFF mode, processing for checking a content of the determination data CD at the time of returning to power ON, and processing for returning to a normal operation based on a comparison (external input information XJ comparison) between external input information XJ read from the non-volatile RAM 15 and external input information XJ received from the external change detection unit 3.

Furthermore, the CPU 12, if recognizing, at the time of restart of supply of the operation power V4 after the pre-OFF mode was set, that a predetermined time has elapsed since the pre-OFF mode was set, without any change in an activation factor, which is to serve as a factor for activating the microcomputer 1, based on the above-described external input information XJ comparison, outputs a power supply control signal SE of "H" in order to execute the power supply stop operation for stopping supplying electric power to at least one ECU subjected to power supply control.

The electric power supply IC 4 includes an internal oscillator 41, a CPU 42, and a communication unit 46. The CPU 42 operates with a clock generated by the internal oscillator 41 in an operating state.

In a normal mode, the electric power supply IC 4 performs voltage conversion with respect to an external power EVC from an electric power supply line LVC at a power supply input unit VI, and supplies the operation power V4 from an power supply output VO1 to the power supply input VCC of the microcomputer 1. At that time, no electric power is supplied from a power supply output VO2 to a power supply input VCC of the external change detection unit 3.

If a control input VC connected to a power supply control terminal PV of the microcomputer 1 is "L", the power supply IC 4 switches the normal operation mode to the pre-OFF mode, and stops the supply of the operation power V4 from the power supply output VO1. At that time, the power supply IC 4 performs intermittent supply of electric power by supplying an intermittent operation power V4p, which is intermittently "H", to the power supply input VCC of the external change detection unit 3 from the power supply output VO2.

In the pre-OFF mode, the power supply IC 4 receives, at an input terminal PI, an OR gate output signal S7 from the OR gate 7, and restarts the supply of the operation power V4 to the microcomputer 1 if the OR gate output signal S7 is "H".

The communication unit 46 is capable of communicating with other external in-vehicle ECUs and the like via communication lines 9. The communication unit 46 may be a Controller Area Network (CAN) IC, and the communication lines 9 may be CAN communication lines (CAN-H, CAN-L), for example. This communication unit 46 is capable of transmitting and receiving data to and from a communication terminal PT of the microcomputer 1.

The communication unit 46 detects whether or not a sleep condition, such as "no signal has been input from the communication lines 9 for a predetermined time period", is satisfied, and outputs, if it is detected that the sleep condition (first condition) is satisfied, communication unit information D46 indicating the satisfaction of the sleep condition to the communication terminal PT of the microcomputer 1.

Furthermore, if, during operation, the communication unit 46 has detected a communication unit activation factor in the pre-OFF mode, the supply of the operation power V4 from the power supply output VO1 is restarted under control of the CPU 42.

The counter unit 6 is constituted by a counter circuit 61 and a switching unit 62, and the counter circuit 61 counts, as a count value, the number of times of rising to "H" of the intermittent operation power V4p, which is intermittently received at a counter input IN from the power supply output VO2 of the power supply IC 4 in the pre-OFF mode. When the count value reaches the predetermined number, the counter circuit 61 determines that a predetermined time has elapsed since the pre-OFF mode was set, and raises a counter output signal S6 from a counter output OUT, which is ordinarily "L", to Furthermore, the counter circuit 61 receives an external power EVC at a power supply input VCC via the switching unit 62, which is switched off if the power supply control signal SE is "H" and is switched on if the power supply control signal SE is anything other than "H". Therefore, when the switching unit 62 is in the OFF state, the supply of electric power to the counter circuit 61 is stopped, and thus the counter circuit 61 is in a non-operation state.

The external change detection unit 3 receives, at a power supply input VCC, electric power from the power supply output VO2 of the electric power supply IC 4 in the pre-OFF mode, and intermittently shifts to an operation state. Then, if having detected a change in an activation factor, which is to serve as a factor for activating the microcomputer 1, the external change detection unit 3 outputs a detection signal S3 of The OR gate 7 receives the detection signal S3 and the counter output signal S6, and outputs a logical sum signal of these signals, as an OR gate output signal S7, to the input terminal PI of the power supply IC 4.

Figure 2:
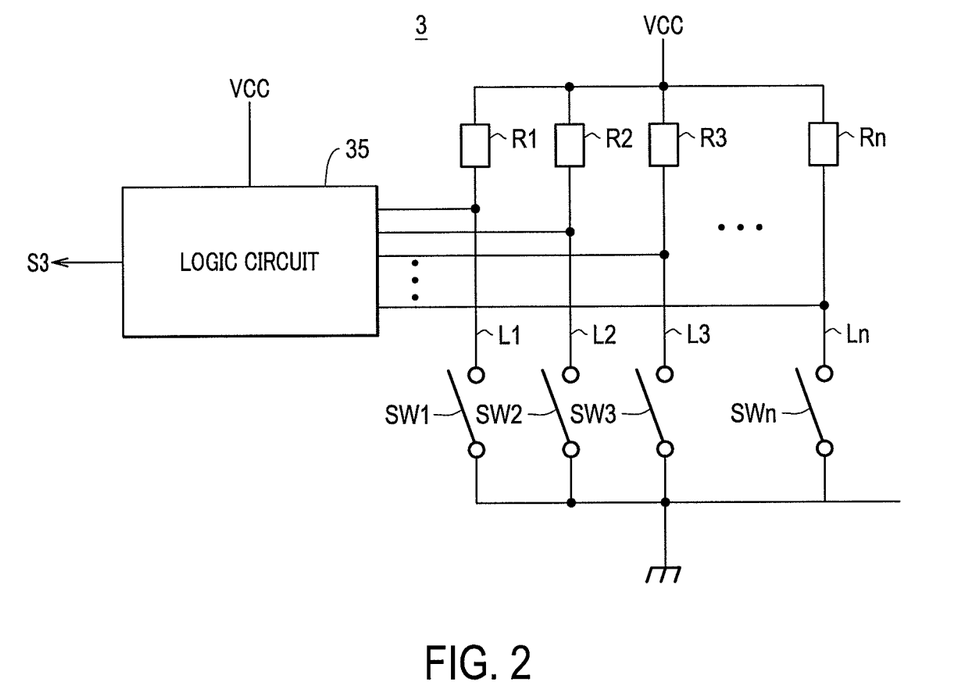
FIG. 2 is a circuit diagram illustrating an internal configuration of an external change detection unit of FIG. 1.

FIG. 2 is a circuit diagram illustrating an internal configuration of the external change detection unit 3. As shown in FIG. 2, the external change detection unit 3 is constituted by a group of switches SW1 to SWn, and a logic circuit 35. Each of the group of switches SW1 to SWn has a configuration that is basically equivalent to that of switches used in the microcomputer 1, and is turned to an ON or OFF state depending on the content of the external input that indicates an environmental change in the vehicle. For example, if the switch SW1 is a door switch, the switch SW1 is turned to the ON or OFF state in which the door is "opened" or the door is "closed". That is, the ON/OFF state of the group of switches SW1 to SWn serves as the external input information indicating a vehicle-related external input content.

The one ends of the respective switches SW1 to SWn of the switch group are grounded, and the other ends thereof are connected to a common power supply input VCC via pull-up resistors R1 to Rn. Wirings L1 to Ln of the group of switches SW1 to SWn on the other end side are connected to inputs of the logic circuit 35.

The logic circuit 35 receives signals from the wirings L1 to Ln, and outputs a detection signal S3, which is "L" if all the signals of the wirings L1 to Ln are "H", and is "H" if any of the wirings L1 to Ln is "L" (if any of the group of switches SW1 to SWn is in the ON state). Therefore, by detecting the rising state from "L" to "H" of the detection signal S3, it is possible to detect a change from the OFF state to the ON state of any of the group of switches SW1 to SWn.

Here, it is provided that a change from the OFF state to the ON state of any of the group of switches SW1 to SWn is a change in an activation factor, which is to serve as a factor for activating the microcomputer 1 that is in the OFF state in the pre-OFF mode.

Accordingly, since the detection signal S3 involves an "H" rising change in which it changes from "L" to "H" when any of the group of switches SW1 to SWn changes from the OFF state to the ON state, the external change detection unit 3 can indicate, with the detection signal S3, a change in an activation factor, which is to serve as a factor for activating the microcomputer 1, of the external input information (the ON/OFF state of the group of switches SW1 to SWn).

Figure 3:
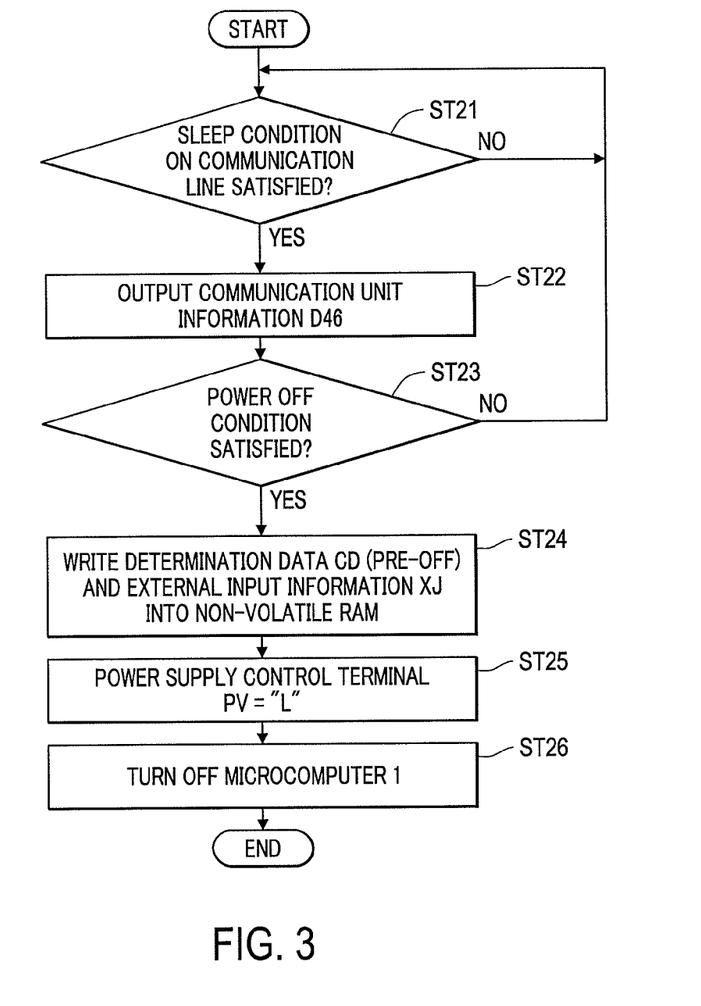
FIG. 3 is a flowchart illustrating processing in which the in-vehicle ECU according to an embodiment that shifts to a pre-OFF mode.

FIG. 3 is a flowchart illustrating processing in which the in-vehicle ECU 10 of Embodiment 1 shifts to the pre-OFF mode.

First, in step ST21, if the communication unit 46 of the power supply IC 4 detects that a sleep condition (first condition) on the communication line 9 is satisfied (Yes), the procedure shifts to step ST22. On the other hand, if no sleep condition is satisfied (No), the step ST21 is repeated, and the in-vehicle ECU 10 continues the normal operation.

In step ST22, which is executed if Yes in step ST21, the communication unit 46 outputs the communication unit information D46 indicating the satisfaction of the sleep condition to the communication terminal PT of the microcomputer 1.

Then, in step ST23, if the microcomputer 1 recognizes satisfaction of a predetermined power OFF condition (second condition), which is a condition for determining that the microcomputer 1 is not needed, such as a condition that a preset time period in which various applications (apps) for the in-vehicle ECU 10 do not operate has elapsed (Yes), the procedure advances to the processes from steps ST24 onward in order to shift from the normal operation mode to the pre-OFF mode. That is, if a combination of the first and second conditions is satisfied, the procedure advances to the processes from steps ST24 onward.

On the other hand, if the predetermined power OFF condition is not satisfied (No), the procedure returns to step ST21, where the in-vehicle ECU 10 continues the normal operation.

In step ST24, which is executed if Yes in step ST23, the microcomputer 1 executes, as preparation processing for shifting to the power OFF state, determination data CD writing processing, which is processing for setting, to the pre-OFF mode, the determination data CD to be written into the non-volatile RAM 15.

Figure 4:
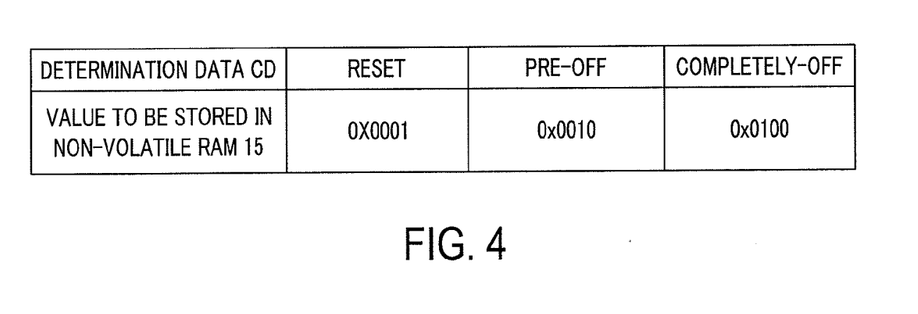
FIG. 4 is a diagram illustrating indication contents of determination data in the form of a table.

FIG. 4 is a diagram illustrating indication contents of the determination data CD in the form of a table. The determination data CD indicates three modes of "reset", "pre-OFF", and "completely-OFF", and values that are to be written into the non-volatile RAM 15 are set to three types of "0×0001", "0×0010", and "×00100", depending on the indication content.

Then, in step ST25, the microcomputer 1 sets the power supply control terminal PV (a microcomputer output signal Si) to "L", and instructs the electric power supply IC 4 to change from the normal operation mode to the pre-OFF mode.

Then, in step ST26, the electric power supply IC 4 stops the supply of the operation power V4 to the microcomputer 1, and the microcomputer 1 shifts to the power OFF state. At that time, the power supply IC 4 supplies the intermittent operation power V4p, which is intermittently "H" level, to the power supply input VCC of the external change detection unit 3 and the counter input IN of the counter unit 6.

Thereafter, the microcomputer 1 completely stops the operation. The external change detection unit 3 operates when the intermittent operation power V4p is "H", and outputs the detection signal S3 of "H" if having detected a change in any of the group of switches SW1 to SWn from the OFF state to the ON state.

On the other hand, the counter unit 6 counts, as the count value, the "H" pulse number of the intermittent operation power V4p that is received at the counter input IN, determines that a predetermined time has elapsed since the pre-OFF mode was set, when the count value reaches the predetermined number, and raises the counter output signal S6 from the counter output OUT to "H" from "L".

The electric power supply IC 4 monitors, as the OR gate output signal S7, the detection signal S3 of the external change detection unit 3. If it is detected, with rising of the OR gate output signal S7 to "H", that rising of the detection signal S3 (a change in an activation factor in the external input information by the group of switches SW1 to SWn) to "H" or rising of the counter output signal S6, the electric power supply IC 4 restarts the supply of the operation power V4 to the microcomputer 1. That is, if one of the detection signal S3 and the counter output signal S6 is "H", the OR gate output signal S7 changes to "H".

Upon detection of rising of the OR gate output signal S7 to "H", the electric power supply IC 4 restarts the supply of the operation power V4 to the microcomputer 1 under control of the CPU 42, and returns the microcomputer 1 to the operation state. As a result, the counter unit 6 receives the operation power V4 at a clear input unit CLR, and thus the count value is initialized to "0", resulting in the stop of the supply of the intermittent operation power V4p to the external change detection unit 3 and the counter unit 6.

In contrast, the communication unit 46 of the power supply IC 4 independently determines whether or not there is the communication unit activation factor based on a signal that is obtained from the communication line 9.

Accordingly, if, in the pre-OFF mode, the communication unit 46 determines that there is the communication unit activation factor, the CPU 42 is notified with this determination result, and the pre-OFF mode is changed to the normal operation mode under control of the CPU 42, allowing the restart of the supply of the operation power V4 to the microcomputer 1.

Figure 5:
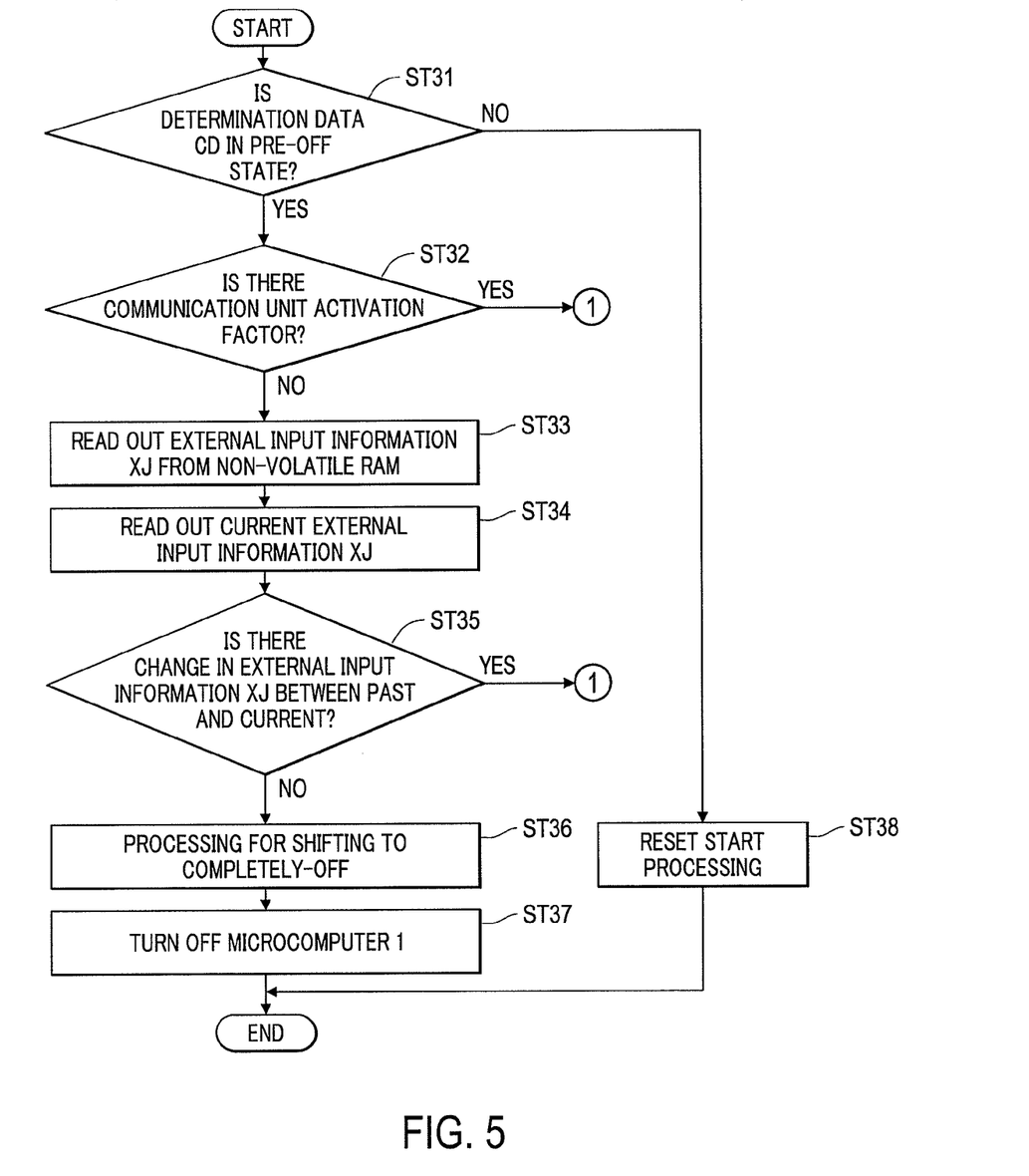
FIG. 5 is a flowchart illustrating an initial operation of a microcomputer immediately after it is turned on according to some embodiments.

FIG. 5 is a flowchart illustrating an initial operation of the microcomputer 1 immediately after it is turned on. Hereinafter, a processing procedure of the initial operation of the microcomputer 1 will be described with reference to FIG. 5.

First, in step ST31, the microcomputer 1 checks whether or not the determination data CD indicates "pre-OFF". In other words, the microcomputer 1 reads out the determination data CD from the non-volatile RAM 15, and if the content of the determination data CD indicates "pre-OFF" (Yes), the procedure advances to the processes from steps ST32 onward. On the other hand, if, in step ST31, the content of the determination data CD does not indicate "pre-OFF" (No), reset start processing is executed in step ST38. Note that the reset start processing will be described in detail later.

Accordingly, by referring to the determination data CD stored in the non-volatile RAM 15 at the time of returning to power ON in which the microcomputer 1 is switched from the power OFF state to the power ON state, the microcomputer 1 can correctly recognize whether or not to perform the reset start processing.

In step ST32, which is performed if Yes in step ST31, the microcomputer 1 refers, for example, to the communication unit information D46, and checks whether or not the communication unit 46 has returned to the normal operation mode upon determination of the communication unit activation factor (whether or not there is the communication unit activation factor). That is, if it is determined in step ST32 that there is the communication unit activation factor (Yes), the procedure ends immediately, and shifts to step ST53, which is a step of processing for changing the content of the determination data CD in the reset start processing. Step ST53 will be described later.

If it is determined that there is no communication unit activation factor (No), the procedure advances to the processes from steps ST33 onward.

In step ST33, which is performed if No in step S32, the CPU 12 of the microcomputer 1 reads out the external input information XJ from the non-volatile RAM 15.

Then, in step ST34, current external input information XJ is read out.

Then, in step ST35, the external input information XJ comparison is performed in which the external input information XJ read out in step ST33 is compared with the external input information XJ read out in step ST34, and it is determined whether or not there is a temporal change in the external input information XJ between before the pre-OFF mode was set, and after the restart of the supply of the operation power after the pre-OFF mode was set. If, in step ST35, a temporal change in the external input information XJ is detected as a result of the external input information XJ comparison (Yes), the procedure shifts to step ST53, which is a step of processing for changing the content of the determination data CD in the reset start processing. Step ST53 will be described later.

On the other hand, if no temporal change in the external input information XJ is not detected in step ST35 (No), processing for shifting to completely-OFF is performed in step ST36.

Figure 6:
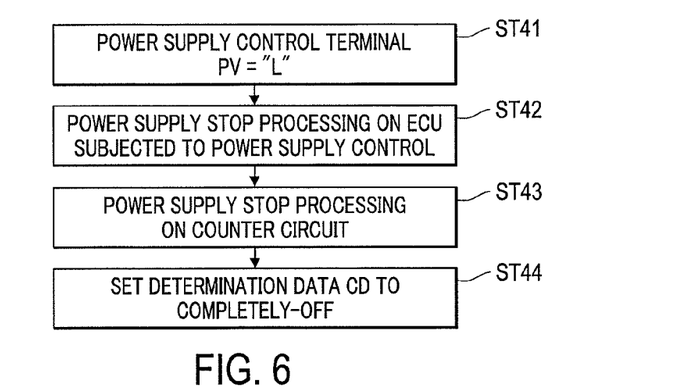
FIG. 6 is a flowchart illustrating processing for shifting to completely-OFF of FIG. 5 in detail.

FIG. 6 is a flowchart illustrating processing for shifting to completely-OFF in step ST36 in detail. Hereinafter, procedure contents of the processing for shifting to completely-OFF will be described with reference to FIG. 6.

First, in step ST41, the power supply control terminal PV is set to "L".

Then, in step ST42, the microcomputer 1 raises the power supply control signal SE to "H", and executes processing for stopping supplying electric power to ECUs that are subjected to power supply control.

Figure 7:
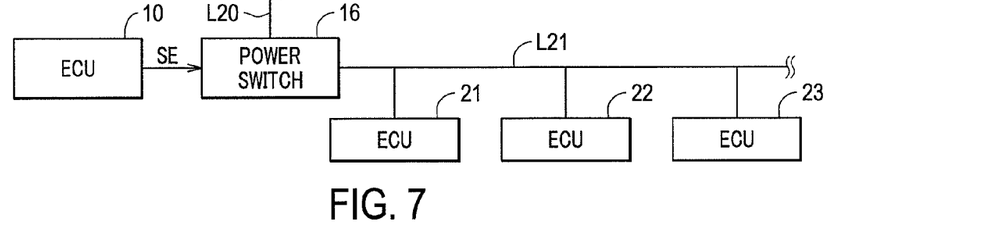
FIG. 7 is a diagram schematically illustrating the relationship between the in-vehicle ECU of an embodiment and an ECU subjected to power supply control.

FIG. 7 is a diagram schematically illustrating the relationship between the in-vehicle ECU 10 and ECUs subjected to power supply control. As shown in FIG. 7, three ECUs 21 to 23, which are ECU that are subjected to power supply control, are connected to a power feeder line L21. A power switch 16 receives a power supply control signal SE from the in-vehicle ECU 10, and electrically isolates the power feeder line L21 from a power feeder line L20 if the power supply control signal SE is "H", and otherwise, electrically connects the power feeder line L21 to the power feeder line L20.

In this configuration, the microcomputer 1 raises, in step ST42, the power supply control signal SE to "H", and controls the power switch 16 so as to electrically isolate the power feeder line L21 from the power feeder line L20, thereby stopping the supply of the electric power to the ECU 21 to 23.

Returning to FIG. 6, in step ST43, the microcomputer 1 raises the power supply control signal SE to "H", and executes processing for stopping the supply of the electric power to the counter circuit 61.

That is, as shown in FIG. 1, the switching unit 62 is supplied with the power supply control signal SE of "H", thereby shifting to the off state, and the supply of the external power EVC to the power supply input VCC of the counter circuit 61 is stopped.

Then, in step ST44, the determination data CD is set to "completely-OFF", and the processing for shifting to completely-OFF ends.

Returning to FIG. 5, in step ST37 after the processing for shifting to completely-OFF in step ST36, the microcomputer 1 is turned off and the procedure ends.

Figure 8:
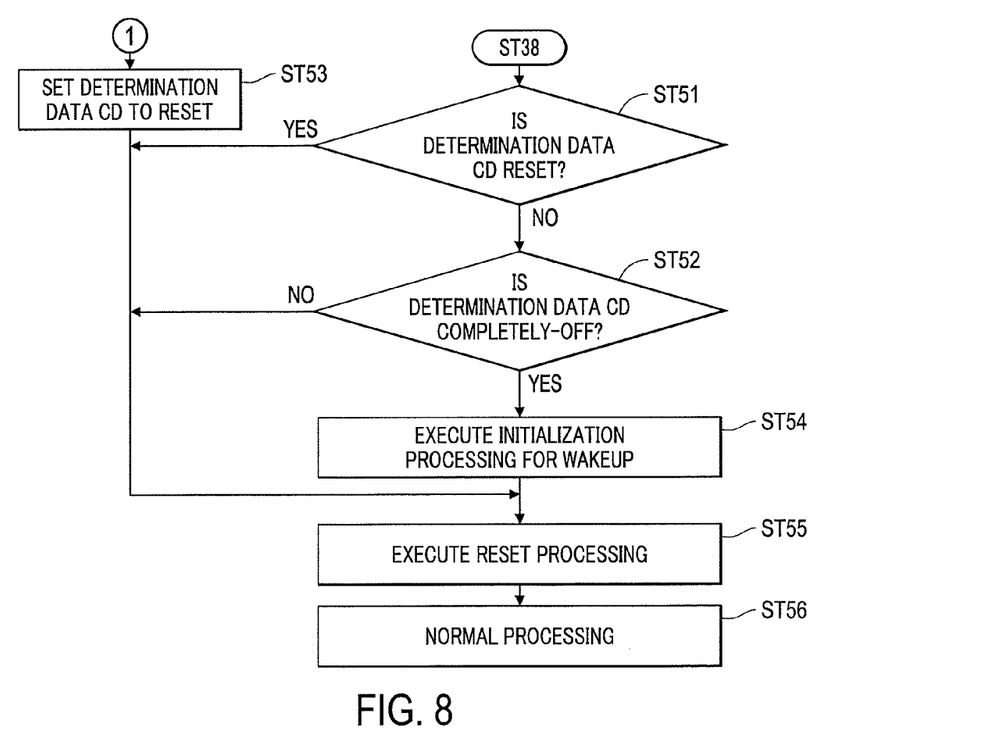
FIG. 8 is a flowchart illustrating reset start processing of FIG. 5.

FIG. 8 is a flowchart illustrating the reset start processing, which is the processing in step ST38 of FIG. 5. Hereinafter, the contents of the reset start processing will be described with reference to FIG. 5. Note that the power supply IC 4, when being reset, automatically supplies the operation power V4 to the microcomputer 1, and turned the microcomputer 1 on.

In step ST51, it is verified whether or not the indication content of the determination data CD is "reset", and if it is "reset" (Yes), the procedure shifts to step ST55, and if it is not "reset" (No), the procedure shifts to step ST52.

In step ST52, which is executed if No in step ST51, it is verified whether or not the indication content of the determination data CD is "completely-OFF", and if it is "completely-OFF" (Yes), the procedure shifts to step ST54, and if it is not "completely-OFF" (No), the procedure shifts to step ST55. Note that the case of No in step ST52 is an irregular case that does not usually occur.

On the other hand, in step ST53, which is executed if Yes in step ST32 or step ST35 of FIG. 5 ("there is the communication unit activation factor" or "there is a temporal change in the external input information XJ"), the processing for changing the determination data CD that indicates "pre-OFF" to "reset" is performed, and the procedure shifts to step ST55.

In step ST54, which is executed if Yes in step ST52, initialization processing for wakeup, such as initialization of an application, is executed.

In step ST55, which is executed if Yes in step ST51, if No in step ST52, and after step ST53 or ST54, reset processing is executed, such as initialization of a ROM, a RAM, and the like, which are not shown in the drawing, of the microcomputer 1.

Then, in step ST56, the microcomputer 1 returns to normal processing.

As described above, the power supply unit of the in-vehicle ECU 10 according to Embodiment 1, which is constituted by the power supply IC 4 and the counter unit 6 including the counter circuit 61, stops the supply of the operation power V4 to the microcomputer 1 when the pre-OFF mode is set, and restarts the supply of the operation power V4 to the microcomputer 1 when the counter circuit 61 counts the lapse of a predetermined time (outputs the counter output signal S6 of "H").

Therefore, it is possible to stop the supply of the operation power V4 to the microcomputer 1 when the pre-OFF mode is set, and to appropriately restart the supply of the operation power to the microcomputer 1 when needed while reducing the electric power consumption of the microcomputer 1 to zero.

The CPU 12 of the microcomputer 1 has a larger circuit configuration than that of the CPU 42 of the power supply IC 4. Since the electric power consumption of the microcomputer 1 constitutes major percent of the entire electric power consumption of the in-vehicle ECU 10, it is possible to effectively achieve a reduction in the electric power consumption of the entire in-vehicle ECU 10, by reducing the electric power consumption to zero in the pre-OFF mode.

Furthermore, the microcomputer 1 (the CPU 12 thereof) of the in-vehicle ECU 10 verifies, at the time of the restart of the supply of the operation power V4 after the pre-OFF mode was set, whether or not there is a change in an activation factor, which is to serve as a factor for activating the microcomputer 1, based on whether or not there is a temporal change in the external input information XJ.

That is, the microcomputer 1 compares newly received external input information XJ with external input information XJ read out from the non-volatile RAM 15, and if there is no temporal change in the external input information XJ, the microcomputer 1 can determine that there is no change in the factor for activating the microcomputer 1.

Furthermore, the microcomputer 1, if recognizing that a predetermined time has elapsed since the pre-OFF mode was set, without any change in an activation factor, which is to serve as a factor for activating the microcomputer 1, executes a power supply stop operation for stopping the supply of electric powers to the ECUs 21 to 23, which are ECUs that are subjected to power supply control. As a result, it is possible to realize a reduction in the electric power consumption of the ECUs 21 to 23.

Hereinafter, description in this regard will be given in detail. The ECUs 21 to 23 may be ECUs that are activated only when the vehicle is running, such as a power steering ECU and an engine controlling ECU, and ECUs that are needed only in emergency, such as a seat belt ECU, and the like. These EUCs are ECUs that do not need to operate if the vehicle is in the completely parked state and nobody is on the board. Therefore, taking into consideration a dark current value, it is preferable to set to the completely turned off state rather than a sleep mode while the ECUs 21 to 23 do not need to operate.

Accordingly, the in-vehicle ECU 10 of Embodiment 1 regards these ECUs 21 to 23 as ECUs subjected to power supply control, and determines that the vehicle is in the completely parked state if no change is detected based on the external input information XJ comparison when a predetermined time has elapsed since the pre-OFF mode was set. With this, the supply of electric powers to the ECUs 21 to 23 is stopped, and a reduction in the electric power consumption can be realized.

Furthermore, the microcomputer 1 of the in-vehicle ECU 10 compares, at the time of the restart of the supply of the operation power V4 after the pre-OFF mode was set, newly received external input information XJ with external input information XJ read out from the non-volatile RAM 15, and execute the power supply stop operation if there is no change in the content.

Therefore, even if the microcomputer 1 is turned off until the restart of the supply of the operation power V4 after the pre-OFF mode was set, it is possible to correctly recognize whether or not a predetermined time has elapsed since the pre-OFF mode was set, without any change in an activation factor, which is to serve as a factor for activating the microcomputer 1.

Furthermore, with respect to the in-vehicle ECU 10, by realizing a separate configuration of the power supply IC 4 and the counter unit 6 (counter circuit 61), it is possible to configure the power supply unit with a power supply IC that does not include a counter circuit, such as an existing power supply IC.

Embodiment 2

Figure 9:
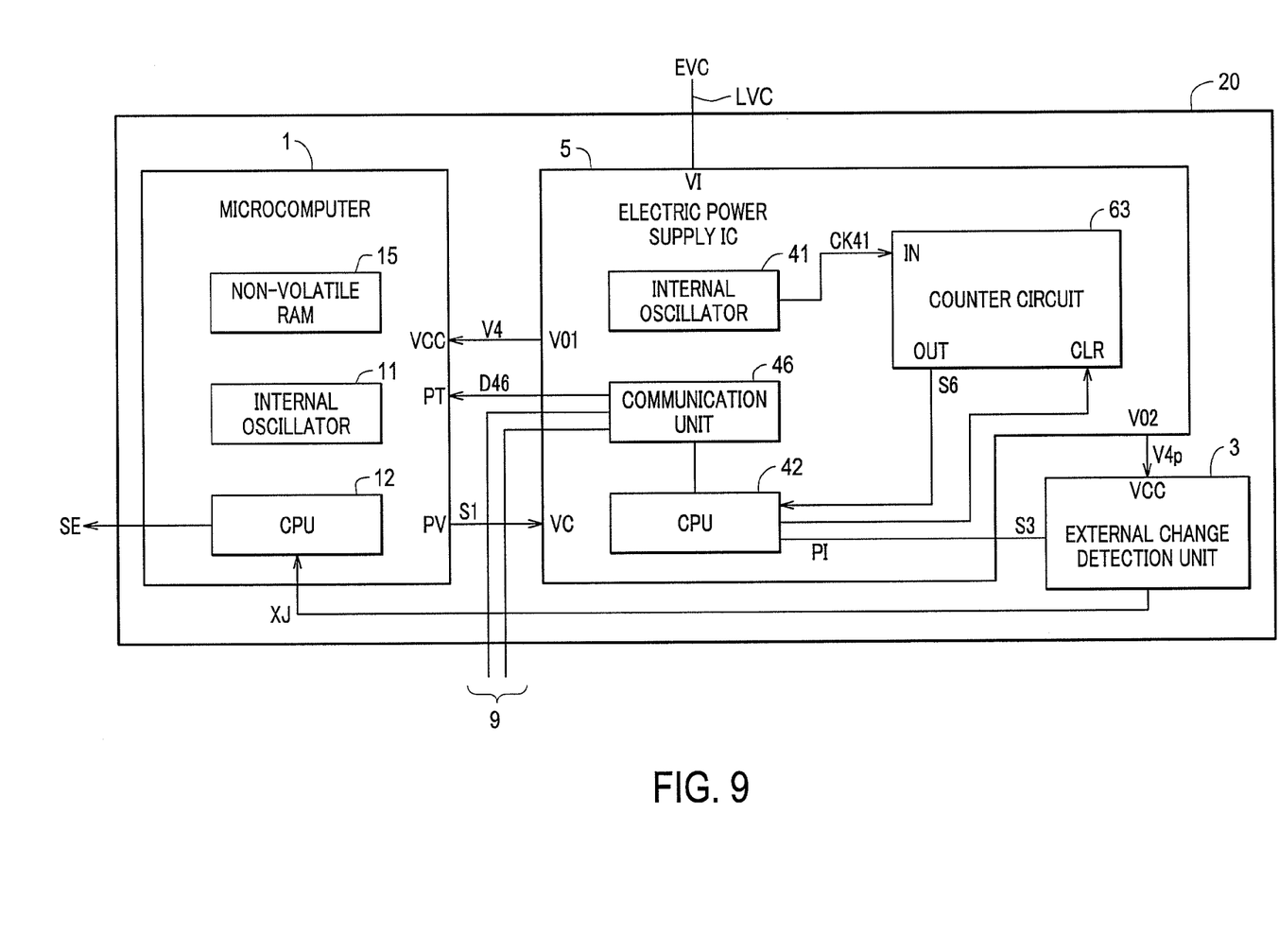
FIG. 9 is a block diagram illustrating an internal configuration of an in-vehicle ECU according to another embodiment of the present invention.

FIG. 9 is a block diagram illustrating an internal configuration of an in-vehicle ECU according to Embodiment 2 of the present invention. An in-vehicle ECU 20 of Embodiment 2 includes a microcomputer 1, an external change detection unit 3, and a power supply IC 5. Since the microcomputer 1, the external change detection unit 3, and the internal oscillator 41, the CPU 42, and the communication unit 46 of the power supply IC 5 are the same as those of Embodiment 1, the same reference numerals are added to those components and descriptions thereof are appropriately omitted. Hereinafter, the differences from the in-vehicle ECU 10 of Embodiment 1 shown in FIG. 1 will be described mainly.

The external change detection unit 3 differs from that of Embodiment 1 in that it outputs a detection signal S3 directly to an input terminal PI of the power supply IC 5.

A counter circuit 63, which is included in the power supply IC 5, starts operating at the start of supply of an intermittent operation power V4p under control of the CPU 42, and counts, as a count value, the clock number of a clock CK 41 generated by the internal oscillator 41 from the initial value. When the count value reaches a predetermined number, the counter circuit 63 determines that a predetermined time has elapsed since the pre-OFF mode was set, and raises a counter output signal S6 from a counter output OUT to "H" from "L". This counter output signal S6 is given to the CPU 42.

The CPU 42 initializes the count value of the counter circuit 63 to "0" when the pre-OFF mode is set, and then receives the detection signal S3 and the counter output signal S6. If at least one of the detection signal S3 and the counter output signal S6 is "H", the supply of the operation power V4 to the microcomputer 1 is restarted, and otherwise, the supply of the operation power V4 to the microcomputer 1 is remained to be stopped.

Then, the power supply IC 5, if having detected the rising to "H" of the detection signal S3 or the counter output signal S6, restarts the supply of the operation power V4 to the microcomputer 1 under control of the CPU 42, and returns the microcomputer 1 to the operation state. As a result, the supply of the intermittent operation power V4p to the external change detection unit 3 is stopped.

Note that processing for shifting to pre-OFF mode, initial operation of the microcomputer immediately after it is turned on, processing for shifting to completely-OFF, and reset start processing have substantially the same contents as those performed in the in-vehicle ECU 10 of Embodiment 1 shown in FIGS. 3, 5, 6, and 8, and thus descriptions thereof are omitted.

Also by the configuration in which the counter circuit 63 is included in the power supply IC 5, as with the in-vehicle ECU 20 of Embodiment 2, it is possible to realize the same operations and effects as those of the in-vehicle ECU 10 of Embodiment 1.

Furthermore, by realizing the in-vehicle ECU 20 of Embodiment 2 with the power supply IC 5 that includes the counter circuit 63 and is formed into one chip, it is possible to achieve effects in simplifying the apparatus configuration.

Other Embodiments

In the above-described embodiments, the microcomputer 1 of the in-vehicle ECU 10 (20) executes the power supply stop operation using, as the determination standard, the comparison result of the above-described external input information XJ comparison, at the time of the restart of the supply of the operation power V4 after the pre-OFF mode was set.

Instead of the use of this determination standard, it is also possible to make connection such that the microcomputer 1 of the in-vehicle ECU 10 (20) can refer to the count value of the counter circuit 61 (63), and the microcomputer 1 determines, as the determination standard, whether or not the count value of the counter circuit 61 reaches the predetermined number at the time of the restart of the supply of the operation power V4 after the pre-OFF mode was set, in order to execute the power supply stop operation.

Although the description of the present invention was given in detail, the description above is an example in all aspects and the present invention is not limited to the example. It will be appreciated that various modifications can be made without departing from the scope of the present invention.

REFERENCE SINGS LIST

1 Microcomputer
3 External change detection unit
4, 5 Power supply IC
6 Counter unit
10, 20 In-vehicle ECU
15 Non-volatile RAM
61, 63 Counter circuit

The invention claimed is:

1. An in-vehicle ECU configured to stop supplying electric power to at least one ECU subjected to power supply control, the in-vehicle ECU comprising:
a microcomputer that operates when supplied with an operation power, and is set to a pre-OFF mode if a predetermined condition is satisfied during the operation; and
a power supply unit that supplies the operation power to the microcomputer when a normal mode is set, and stops the supply of the operation power to the microcomputer when the pre-OFF mode is set,
wherein the power supply unit includes a counter circuit that counts down a predetermined time when the pre-OFF mode is set, and the power supply unit restarts the supply of the operation power to the microcomputer when the predetermined time has elapsed, and
wherein the microcomputer executes a power supply stop operation for stopping supplying electric power to the at least one ECU subjected to power supply control if, at the time of the restart of the supply of the operation power after the pre-OFF mode was set, the predetermined time has elapsed since the pre-OFF mode was set, without any change in an activation factor, wherein the activation factor serves as a factor for activating the microcomputer.

2. The in-vehicle ECU according to claim 1,
further comprising an external change detection unit that detects, when the pre-OFF mode is set, a change in the activation factor, which is to serve as a factor for activating the microcomputer, of external input information indicating a vehicle-related external input content, and outputs a detection signal ,
wherein the power supply unit restarts the supply of the operation power to the microcomputer if the detection signal indicates the change in the activation factor of the external input information, when the pre-OFF mode is set,
the microcomputer includes a non-volatile memory, and the microcomputer receives the external input information and writes the external input information into the non-volatile memory, when the pre-OFF mode is set, and
the microcomputer compares newly received external input information with the external input information read out from the non-volatile memory, at the time of the restart of the supply of the operation power after the pre-OFF mode was set, and executes the power supply stop operation if there is no change in the content.

3. The in-vehicle ECU according to claim 1,
wherein the power supply unit includes: a power supply IC that is formed into one chip; and a counter circuit that is formed separately from the power supply IC.

4. The in-vehicle ECU according to claim 1,
wherein the power supply unit includes a power supply IC that includes the counter circuit and is formed into one chip.

5. The in-vehicle ECU according to claim 2,
wherein the power supply unit includes: a power supply IC that is formed into one chip; and a counter circuit that is formed separately from the power supply IC.

6. The in-vehicle ECU according to claim 2,
wherein the power supply unit includes a power supply IC that includes the counter circuit and is formed into one chip.

7. A method to stop supplying electric power to at least one ECU subjected to power supply control, the method comprising:

operating a microcomputer when supplied with an operation power;
setting the microcomputer to a pre-OFF mode if a predetermined condition is satisfied during the operation;
supplying, via a power supply unit, the operation power to the microcomputer when a normal mode is set; and
stopping the supply of the operation power to the microcomputer when the pre-OFF mode is set;
counting down a predetermined time when the pre-OFF mode is set,
restarting the supply of the operation power to the microcomputer when the predetermined time has elapsed; and
executing a power supply stop operation for stopping supplying electric power to the at least one ECU subjected to power supply control if, at the time of the restart of the supply of the operation power after the pre-OFF mode was set, the predetermined time has elapsed since the pre-OFF mode was set, without any change in an activation factor,
wherein the activation factor serves as a factor for activating the microcomputer.

8. The method according to claim 7, further comprising:
detecting, when the pre-OFF mode is set, a change in the activation factor, which is to serve as a factor for activating the microcomputer, of external input information indicating a vehicle-related external input content, and outputting a detection signal,
wherein the supply of the operation power to the microcomputer is restarted if the detection signal indicates the change in the activation factor of the external input information, when the pre-OFF mode is set,
wherein the external input information is received and the external input information is written into non-volatile memory when the pre-OFF mode is set, and
wherein newly received external input information is compared with the external input information read out from the non-volatile memory, at the time of the restart of the supply of the operation power after the pre-OFF mode was set, and the power supply stop operation is executed if there is no change in the content.

* * * * *